(12) United States Patent
Takeda et al.

(10) Patent No.: US 6,746,561 B1
(45) Date of Patent: Jun. 8, 2004

(54) METHOD AND DEVICE FOR MANUFACTURING A WINDOW PANE WITH RESIN FRAME

(75) Inventors: Hisashi Takeda, Aichi (JP); Yasuhiro Shibuya, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 488 days.

(21) Appl. No.: 09/807,461
(22) PCT Filed: Aug. 11, 2000
(86) PCT No.: PCT/JP00/05421
§ 371 (c)(1), (2), (4) Date: Nov. 14, 2001
(87) PCT Pub. No.: WO01/12419
PCT Pub. Date: Feb. 22, 2001

(30) Foreign Application Priority Data

Aug. 13, 1999 (JP) ............................................. 11-229217

(51) Int. Cl.⁷ ............................................... B29C 47/02
(52) U.S. Cl. ............................ 156/244.27; 156/244.11; 156/538; 156/500; 264/176.1
(58) Field of Search ................................. 156/107–109, 156/244.11, 244.27, 500, 538, 361; 296/96.21, 200; 264/176.1, 200; 425/113

(56) References Cited

U.S. PATENT DOCUMENTS

| 18,264 | A | * | 9/1857 | Mitchel ........................ 276/22 |
| 4,769,105 | A | * | 9/1988 | Lisec ........................ 156/468 |
| 5,133,537 | A | | 7/1992 | Shirahata et al. |
| 5,395,563 | A | | 3/1995 | Goto et al. |
| RE35,291 | E | * | 7/1996 | Lafond ........................ 156/109 |
| 5,693,174 | A | | 12/1997 | Nakata et al. ............... 156/361 |
| 5,795,421 | A | | 8/1998 | Takahashi et al. ........... 156/108 |
| 6,030,475 | A | * | 2/2000 | Spotts, Jr. ..................... 156/64 |
| 6,394,164 | B1 | * | 5/2002 | Lafond ........................ 156/523 |

FOREIGN PATENT DOCUMENTS

| JP | 57-158479 | 9/1982 | ............. E06B/3/62 |
| JP | 4-241925 | 8/1992 | ............. B29C/47/02 |
| JP | 6-126804 | 5/1994 | ............. B29C/47/02 |
| JP | 8-336877 | 12/1996 | ............. B29C/47/02 |
| JP | 10-6378 | 1/1998 | ............. B29C/47/02 |

OTHER PUBLICATIONS

International Search Report.

* cited by examiner

*Primary Examiner*—Jeff H. Aftergut
*Assistant Examiner*—Jessica Rossi
(74) *Attorney, Agent, or Firm*—Sughrue Mion, PLLC

(57) ABSTRACT

A shaped product, which travels from a shaping die, is passed through a delimiting space between a pressing roller provided in a floating frame of a pressing member and a windowpane introduced in under the pressing roller to be forcibly fitted to the windowpane. Thus, the shaped product is uniformly unified to a peripheral portion of the windowpane by preventing variations in a adhesion force from occurring.

19 Claims, 8 Drawing Sheets

METHOD AND DEVICE FOR MANUFACTURING A WINDOW PANE WITH RESIN FRAME

TECHNICAL FIELD

The present invention relates to a method for preparing a panel (windowpane) with a resinous frame, which is suited for a window opening of a vehicle or a building.

BACKGROUND ART

Windowpanes, which are fitted into the window openings of vehicles or buildings, have usually had the following structure. The structure is one wherein a panel (windowpane, hereinbelow referred to as the pane), such as a glass sheet and a plastic sheet, has a peripheral portion fitted with a resinous frame, such as a molded member or a gasket of synthetic resin, to improve ornamentality or sealing properties. The pane that has the peripheral portion fitted with a resinous frame is called a windowpane with a resinous frame.

FIG. 10 is a perspective view showing a conventional apparatus employed in a method for preparing a windowpane with a resinous frame, FIG. 11 is a perspective view showing how a shaped product is introduced into the pressing member shown in FIG. 10, and FIG. 12 is a sectional view as seen from the direction indicated by arrows of XII—XII of FIG. 11. In these Figures, reference numeral 1 designates an extruder, and reference numeral 2 designates a shaping die, which is attached to the leading edge of the extruder 1, and which extrudes a resinous material for a frame in a certain cross-sectional shape to form a shaped product 3 as a frame. Reference numeral 4 designates the pressing member, which is provided at a position apart from the shaping die 2 by a certain distance, and reference numeral 5 designates a pair of upper and lower slit plates, which are provided on an insertion side of the pressing member 4 for the shaped product 3. The slit plates 5 are ones that serve to expand the opening of a biting portion 3a of the shaped product 3 so that a pane 7 sucked and supported by an operating robot 6 can easily have a peripheral portion bit into the biting portion 3a.

The pressing member 4 includes a hollow portion 4a for passing the shaped product 3 therethrough and a pane insertion slit 4b for receiving the peripheral portion of the pane 7. The sectional shape of the hollow portion 4a substantially conforms to the sectional shape of a frame 8, which is provided by fitting the shaped product 3 on the peripheral portion of the pane 7. The pressing member 4 is supported by a spring 9a coupled to an upper portion thereof and a spring 9b coupled to a lower portion thereof. On a side of the pressing member 4 close to the pane insertion slit 4b, an upper horizontal roller 10 and a lower horizontal roller 11 are rotatably provided at upper and lower positions so as to sandwich the pane insertion slit 4b therebetween. The lowermost position of a rotating surface 10a of the upper horizontal roller 10 as a reference surface is located so as to project slightly downwardly from an upper end surface of the pane insertion slit 4b.

The preparation of a windowpane with a resinous frame by this apparatus is carried out in the following procedure. The shaping die 2, which is attached to the leading edge of the extruder 1, extrudes a resinous material for a frame in a certain cross-sectional shape to form the shaped product 3. The shaped product 3 travels toward the pressing member 4 by being pulled by a pulling device (not shown). The shaped product 3 is introduced into the hollow portion 4a of the pressing member 4 and passed through the hollow portion 4a, having the biting portion 3a expanded by the slit plates 5. At the time, the pane 7 is waiting at a certain location, being supported by the operating robot 6 at rest.

Then, the operating robot 6, which has been instructed on a travel path, operates, starting the movement of the pane 7. The pane 7 is introduced into the pane insertion slit 4b of the pressing member 4 through between the upper horizontal roller 10 and the lower horizontal roller 11, being guided by the upper horizontal roller 10 and the lower horizontal roller 11. The pane 7 is moved so that the pressing member 4 relatively moves along the peripheral portion of the pane 7. While the pane 7 is guided by the upper horizontal roller 10 and the lower horizontal roller 11, the pane is introduced and bitten through the pane insertion slit 4b into the biting portion 3a of the shaped product 3, which is passing through the hollow portion 4a. Thus, the shaped product 3 is forcibly fitted to the peripheral portion of the pane 7 by the pressing member 4, being unified with the pane 7 as the frame 8.

In the method for preparing a windowpane with a resinous frame as stated earlier, the pressing member 4 is supported by the springs 9a, 9b. If the peripheral portion of the pane 7 is not located at a certain position with respect to the upper horizontal roller 10 and the lower horizontal roller 11 when the peripheral portion of the pane 7 is passing between the upper horizontal roller 10 and the lower horizontal roller 11 for insertion through the pane insertion slit 4b into the hollow portion 4a, the peripheral portion of the pane 7 abuts against the upper horizontal roller 10 and the lower horizontal roller 11. As a result, the pressing member 4 is pushed up by the peripheral portion of the pane 7 through the upper horizontal roller 10 or is pushed down by the peripheral portion through the lower horizontal roller 11. The position of the pressing member 4 vertically shifts against the urging forces of the springs 9a, 9b, following the peripheral portion of the pane 7. Thus, the peripheral portion of the pane 7 can pass at a constant position without taking a wavy state with respect to the hollow portion 4a. Size deviations of the pane 7 and variations in the curved shape of the pane in a thickness direction thereof can be absorbed by deformation of the springs 9a, 9b, preventing the frame 8 unified to the pane 7 from having poor appearance.

In the method for preparing a windowpane with a resinous frame as stated earlier, the pressing member 4, the upper horizontal roller 10 and the lower horizontal roller 11 can move vertically as a unit. The upper horizontal roller 10 or the lower horizontal roller 11 can not move vertically independently of the pressing member 4. Under the circumstances, it is difficult to follow the pane 7 in sufficiently rapid fashion since the upper horizontal roller 10, the lower horizontal roller 11 and the pressing member 4 move vertically as the unit. If it is difficult for the pressing member 4 to make a follow-up motion in sufficiently rapid fashion during vertical movement, the shaped product 3, which is passing through the hollow portion 4a, is prevented from being forcibly fitted to the peripheral portion of the pane 7 at a certain equal pressure since the hollow portion 4a is also bad at a follow-up motion. As a result, variations in the degree of adhesion of the shaped product 3 to the pane 7 cause, preventing the frame 8 unified to the pane 7 from having good appearance.

It is an object of the present invention to provide a method for preparing a windowpane with a resinous frame, offering the following advantages:

A portion, through which a shaped product is passing, can make a rapid follow-up motion irrespectively of size deviations or variations in the curved shape of a pane.

- A shaped product can be unified to a peripheral portion of a pane at a certain equal pressure without creating variations in the adhesion force.
- A frame, which is unified to a pane, can have good appearance.

DISCLOSURE OF THE INVENTION

According to a first aspect of the present invention, there is provided a method for preparing a windowpane with a frame, which comprises extruding a resinous material for a frame in a certain shape from a shaping die to form a shaped product for the frame, introducing a windowpane into a pressing member as well as forwarding the shaped product to the pressing member, the pressing member located at a position apart from the shaping die by a certain distance, and relatively moving the pressing member with respect to the windowpane along a peripheral portion of the windowpane so as to forcibly fit the shaped product to at least one surface of the peripheral portion of the windowpane, characterized in that it comprises providing a pressing roller in a floating frame located so as to be vertically movable with respect to the pressing member, providing a delimiting space, at least a portion of which is defined by the pressing roller, and unifying the frame to the peripheral portion of the windowpane by forcibly fitting the shaped product to the peripheral portion of the windowpane by means of the pressing roller while passing the shaped product and the windowpane through the delimiting space.

According to a second aspect of the present invention, there is provided a method for preparing a windowpane with a frame, which comprises extruding a resinous material for a frame in a certain shape from a shaping die to form a shaped product for the frame, introducing a windowpane into a pressing member as well as forwarding the shaped product to the pressing member, the pressing member located at a position apart from the shaping die by a certain distance, and relatively moving the pressing member with respect to the windowpane along a peripheral portion of the windowpane so as to forcibly fit the shaped product to one surface of the peripheral portion of the windowpane, characterized in that it comprises providing a floating frame so as to be vertically movable with respect to the pressing member, providing a swingable frame in the floating frame so as to be swingable, providing a pressing roller in the swingable frame to provide a delimiting space, at least a portion of which is defined by the pressing roller, and unifying the frame to the peripheral portion of the windowpane by forcibly fitting the shaped product to the peripheral portion of the windowpane by the pressing roller while passing the shaped product and the windowpane through the delimiting space.

According to a third aspect of the present invention, there is provided a method for preparing a windowpane with a frame, which comprises extruding a resinous material for a frame in a certain shape from a shaping die to form a shaped product for the frame, introducing a windowpane into a pressing member as well as forwarding the shaped product to the pressing member, the pressing member located at a position apart from the shaping die by a certain distance, and relatively moving the pressing member with respect to the windowpane along a peripheral portion of the windowpane so as to forcibly fit the shaped product to both surfaces of the peripheral portion of the windowpane, characterized in that it comprises providing a floating frame with a lower pressing roller for pressing a lower side of the shaped product and a vertical wall roller for pressing an edge surface of the shaped product remote from an opening direction of a windowpane biting portion of the shaped product toward an inner portion of the windowpane, the floating frame provided so as to be vertically movable with respect to the pressing member, and unifying the frame to the peripheral portion of the windowpane by forcibly fitting the shaped product to the peripheral portion of the windowpane by means of the lower pressing roller while passing the shaped product and the windowpane through a delimiting space, at least a portion of which is defined by the lower pressing roller and the vertical wall roller.

According to a fourth aspect of the present invention, there is provided an apparatus for preparing a windowpane with a frame, which comprises a shaping die for extruding a resinous material for a frame in a certain shape to form a shaped product for the frame, a pressing member provided at a position apart from the shaping die by a certain distance and receiving the is shaped product and a windowpane therein, and a driving device for relatively moving the pressing member with respect to the windowpane along a peripheral portion of the windowpane, and which forcibly fits the shaped product to at least one surface of the peripheral portion of the windowpane, characterized in that the pressing member includes a base frame, a floating frame provided inside the base frame through an elastic member so as to be vertically movable with respect to the base frame, and a pressing roller provided inside the floating roller, the pressing roller defining at least a portion of a delimiting space, through which the shaped product and the windowpane are passing, wherein the shaped product is forcibly fitted to the peripheral portion of the windowpane by the pressing roller to be unified to the peripheral portion of the windowpane.

According to a fifth aspect of the present invention, there is provided an apparatus for preparing a windowpane with a frame, which comprises a shaping die for extruding a resinous material for a frame in a certain shape to form a shaped product for the frame, a pressing member provided at a position apart from the shaping die by a certain distance and receiving the shaped product and a windowpane therein, and a driving device for relatively moving the pressing member with respect to the windowpane along a peripheral portion of the windowpane, and which forcibly fits the shaped product to at least one surface of the peripheral portion of the windowpane, characterized in that the pressing member includes a base frame, a floating frame provided inside the base frame through an elastic member so as to be vertically movable with respect to the base frame, a swingable frame swingably provided inside the floating frame, and a pressing roller provided inside the swingable frame, the pressing roller defining at least a portion of a delimiting space, through which the shaped product and the windowpane are passing, wherein the shaped product is forcibly fitted to the peripheral portion of the windowpane by the pressing roller to be unified to the peripheral portion of the windowpane.

According to a sixth aspect of the present invention, there is provided an apparatus for preparing a windowpane with a frame, which comprises a shaping die for extruding a resinous material for a frame in a certain shape to form a shaped product for the frame, a pressing member provided at a position apart from the shaping die by a certain distance and receiving the shaped product and a windowpane therein, and a driving device for relatively moving the pressing member with respect to the windowpane along a peripheral portion of the windowpane, and which forcibly fits the shaped product to at least one surface of the peripheral portion of the windowpane, characterized in that the pressing member includes a base frame, a floating frame provided inside the base frame through an elastic member so as to be vertically movable with respect to the base frame, and a lower pressing roller for pressing a lower side of the shaped product and a vertical wall roller for pressing an edge surface of the shaped product remote from an opening direction of a windowpane biting portion of the shaped product toward an inner portion of the windowpane, both rollers provided inside the floating frame and defining at least a portion of a delimiting space, through which the shaped product and the windowpane are passing, wherein the shaped product is forcibly fitted to the peripheral portion of the windowpane by the lower pressing roller and the vertical wall roller to be unified to the peripheral portion of the windowpane.

It is preferable that the shaped product is forcibly fitted and unified to the peripheral portion of the windowpane while pressing an edge surface of the pane against the floating frame directly or through the shaped product to provide the floating frame with a to-and-fro motion in a direction perpendicular to the travel direction of the shaped product as seen in a plan view in the preparation method and the apparatus for a windowpane with a resinous frame stated above. In this case, the shaped product can be forcibly fitted to the pane, using the edge surface of the pane as a reference.

In the first, second, fourth and fifth aspects of the present invention, the shaped product is forcibly fitted to the peripheral portion of the pane by the pressing roller. In the third and sixth aspects of the present invention, the shaped product is forcibly fitted to the peripheral portion of the pane by the lower pressing roller. In the first through sixth aspects of the present invention, the floating frame can move vertically when there is a size deviation or a variation in the curved shape of the pane. Specifically, it is meant that the floating frame is floating with respect to the base frame.

In accordance with the present invention, the floating frame can make a good follow-up motion rapidly in a floating state even if there is a size deviation or a variation in the curved shape of the pane. Thus, the shaped product can be unified to the peripheral portion of the pane at a constant equal pressure without causing a variation in the adhesion force. As a result, the adhesion force of the frame to the pane can be ensured. The unified frame can have good appearance since the frame is forcibly fitted to the pane at the equal pressure as a whole.

BEST MODE FOR CARRYING OUT THE INVENTION

Figure 1:
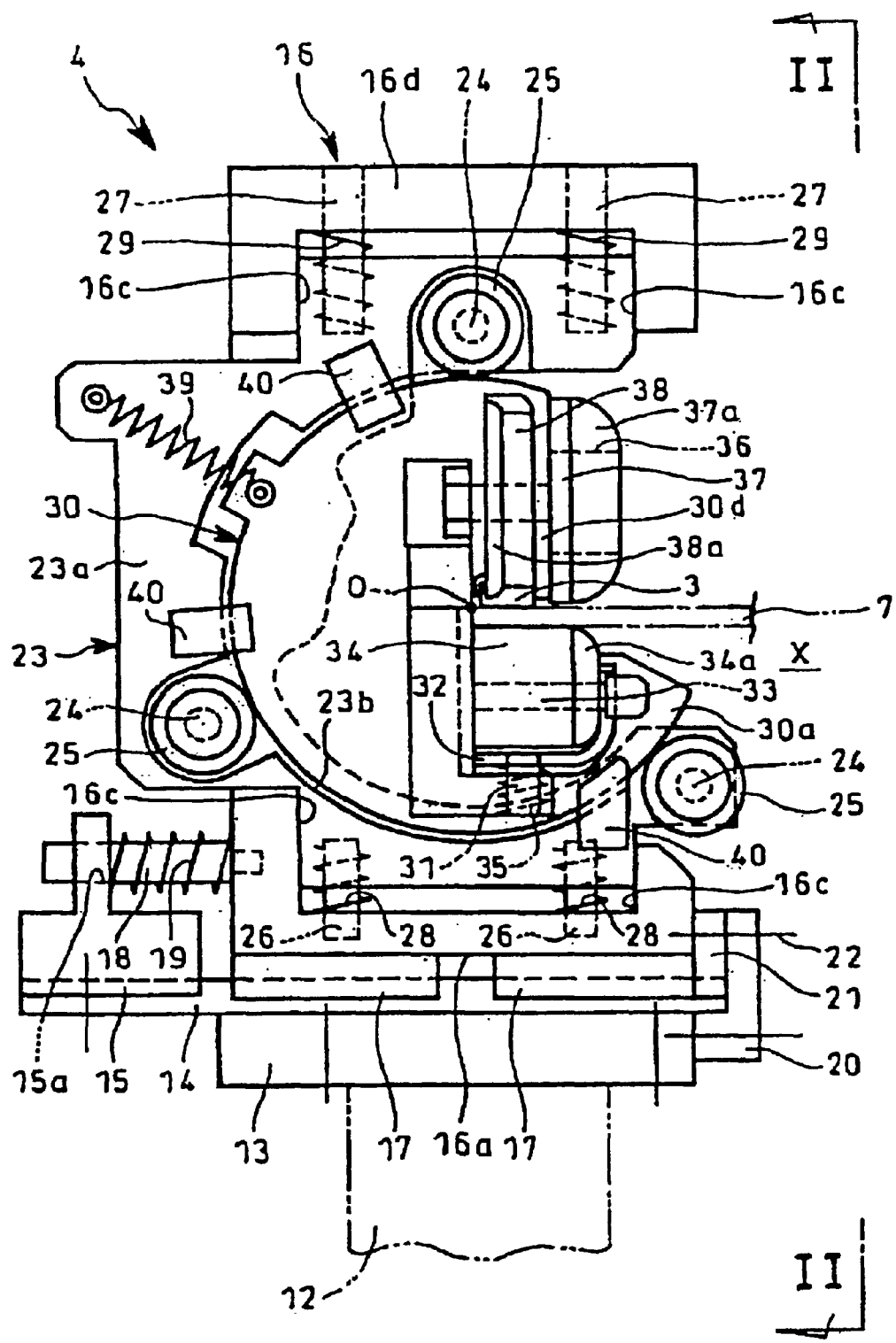
FIG. 1 is a front view showing an embodiment of a pressing member, which is employed in the preparation method and apparatus for a windowpane with a resinous frame according to the present invention.
Figure 2:
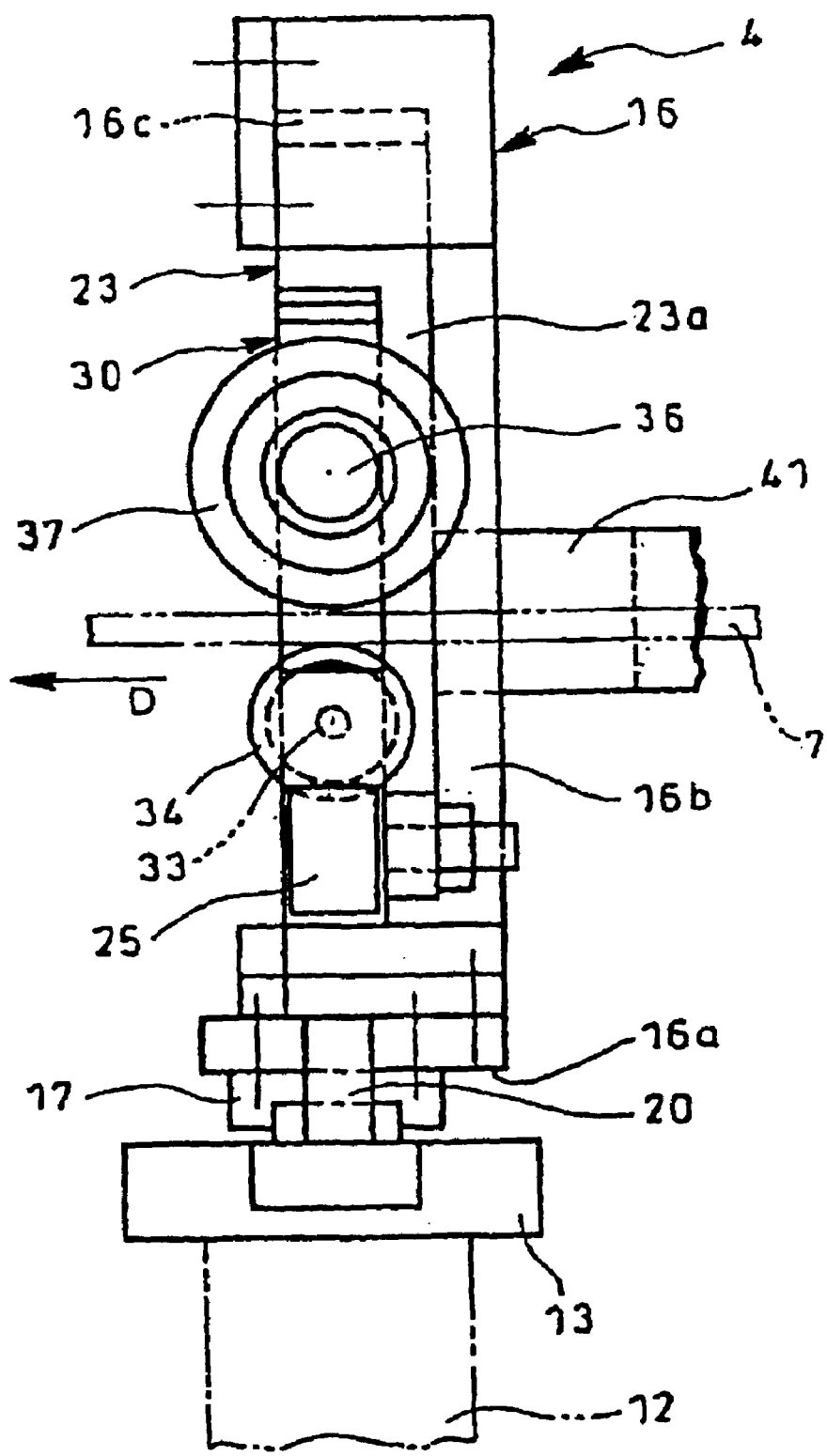
FIG. 2 is a view as seen from the direction indicated by arrows of II—II of FIG. 1.
Figure 3:
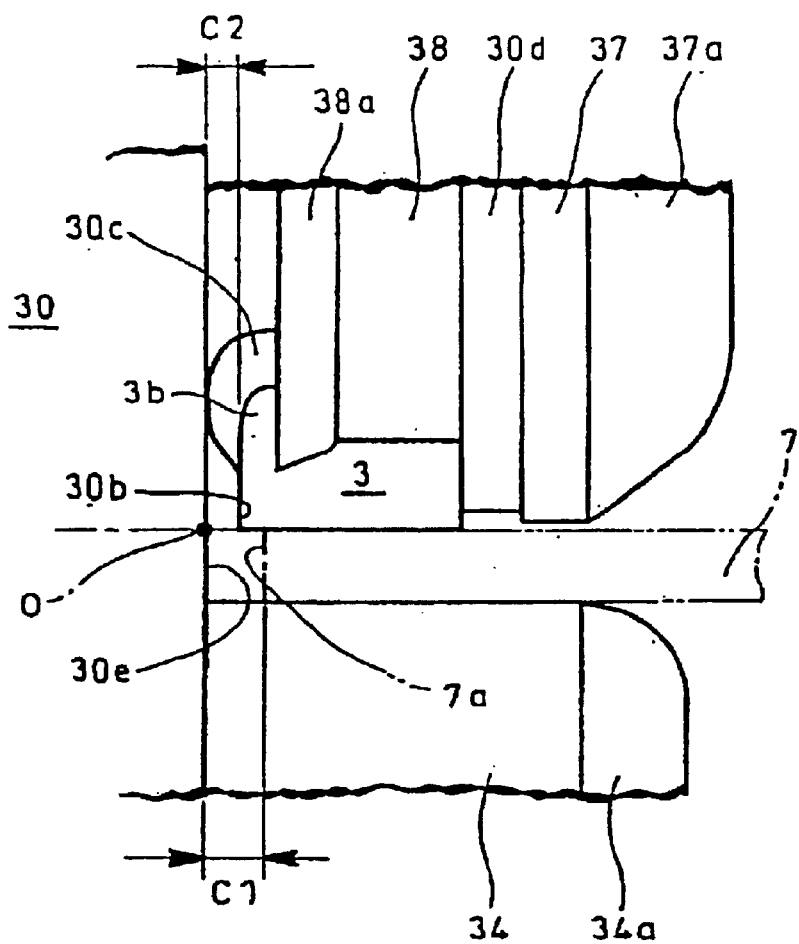
FIG. 3 is an enlarged view of a portion of a swingable frame in the vicinity of the swing center thereof in the pressing member shown in FIG. 1.

Now, preferred embodiments of the preparation method and apparatus for a windowpane with a resinous frame according to the present invention will be described, referring to the accompanying drawings. FIG. 1 is a front view showing an example of the pressing member, which is employed in the preparation method and apparatus for a windowpane with a resinous frame according to the present invention, FIG. 2 is a view as seen from the direction indicated by arrows of II—II of FIG. 1, and FIG. 3 is an enlarged view of a portion of a swingable frame in the vicinity of the swing center thereof in the pressing member shown in FIG. 1. The apparatus, which is applied to the preparation method for a windowpane with a resinous frame according to the present invention, is the same as the conventional apparatus except for the pressing member. Now, explanation will be made mainly about the pressing member. In the embodiments, the pressing member 4 is provided at a location apart from a shaping die 2, which is attached to the leading edge of an extruder 1, as in the conventional apparatus of FIG. 10.

Next, the pressing member 4 will be described in detail. The pressing member 4 according to an embodiment is one that forcibly fits and unifies a shaped product 3 to a peripheral portion of one surface of a pane 7, such as a glass sheet and a plastic sheet. A base 13, which is mounted to the top of a support 12, has a guide rail 14 provided thereon to extend in a direction substantially perpendicular to the travel direction D of the shaped product 3 as seen in a plan view. The guide rail 14 has an end remote from the side X of an operation robot 6 (see FIG. 10) provided with a guide bracket 15. The guide rail 14 has a vertical base frame 16 provided thereabove. The vertical base frame 16 has guided blocks 17 fixed to a bottom 16a thereof. The guided blocks 17 are engaged with the guide rail 14. The vertical base frame 16 is configured to be slidable in the longitudinal direction of the guide rail 14 through the guided blocks 17. The vertical base frame 16 has a side facing the guide bracket 15 provided with a guide rod 18, which extends in the horizontal direction so to be parallel with the guide rail 14. The guide rod 18 is slidably introduced into a guide hole 15a, which is formed in the guide bracket 15.

The guide rod 18 has a helical compression spring 19 disposed around the periphery thereof so as to be in a position between the guide bracket 15 and the side of the vertical base frame 16, urging the vertical base frame 16 toward the X side. The base 13 has a side on the X side fitted with a stopper 20. Between the stopper 20 and the X side of the vertical base frame 16 is interposed a spacer 21. By fastening the stopper 20, the spacer 21 and a lower end of the vertical base frame 16 by a bolt 22, the vertical base frame 16 can be fixed to the guide rail 14, being prevented from sliding with respect to the guide rail 14.

The vertical base frame 16 has a vertical portion 16b formed with a cutout opening, which is formed in a substantially circular shape as seen in the front view and opens toward the X side. The vertical portion 16b has guideways 16c provided therein in the width direction thereof on both upper and lower ends. The base frame 16 has a front side provided with a substantially vertical floating frame 23, which is guided by the guideways 16c so as to be floatable in the vertical direction. The floating frame 23 has a vertical portion 23a formed with a cutout opening 23b, which is formed in a substantially circular shape as seen in the front view and opens towards the X side. The vertical portion 23a is provided with a plurality of horizontal shafts 24, which are located at certain intervals in the circumferential direction along the periphery of the circular cutout opening 23b and have the shaft centers extending to the travel direction D of the shaped product 3. The horizontal shafts 24 have horizontal supporting rollers 25 rotatably carried thereon, respectively.

The base frame 16 has the bottom 16a and a top 16d provided with a plurality of guide rods 26, 27, which are spaced from each other at a certain distance in the width direction and extend vertically. The guide rods 26 have upper ends engaged into vertical guide holes with play, the vertical guide holes being formed in a lower end of the floating frame 23. The guide rods 27 have lower ends engaged with vertical guide holes with play, the vertical guide holes being formed in an upper end of the floating frame 23. Around the peripheries of portions of the guide rods 26 that project upward from the bottom 16a and around the peripheries of portions of the guides rods 27 that project downward from the top 16d, helical compression springs 28, 29 are disposed to float the floating frame 23, urging the floating frame 23 upward or downward.

The cutout opening 23b of the floating frame 23 has a swingable frame 30 accommodated therein so that the swingable frame is supported by the horizontal supporting rollers 25 to be swingable in the circumferential direction. The swingable frame 30 has a portion toward the X side cut out so that the swingable frame 30 is formed in a substantially semi-circular plate shape as a whole. An arched arm 30a, which forms a lower end of the swingable frame 30, has a guide hole formed therein in a substantially vertical direction, and a guide rod 31, which is fitted in the guide hole with play, projects upward from the guide hole.

The guide rod 31 has an upper end fixed with a bracket 32, which is formed in a substantially L character shape as seen in the front view. The bracket 32 has a floating roller 34 for positioning the pane 7 mounted in rotatable fashion through a horizontal shaft 33, which has the shaft center extending in a direction perpendicular to the horizontal shafts 24 as seen in the plan view. Around the periphery of a lower portion of the guide rod 31 below the bracket 32, a helical compression spring 35 is disposed to urge the floating roller 34 upward through the bracket 32, floating the floating roller. The floating roller 34 has an end close to the center of the swingable frame 30 substantially located just under the swing center O of the swingable frame 30. The floating roller 34 has an end close to the X side formed with a roundly chamfered portion 34a, which has the diameter gradually decreased toward an outward direction of the swingable frame 30 to smoothly guide the pane 7 supplied by the operating robot 6. The floating roller 34 has an upper end of the periphery located slightly below the swing center O.

Above the swing center O of the swingable frame 30, a horizontal shaft 36 is mounted in parallel with the horizontal shaft 33 so as to project from the swingable frame 30 toward the X side. The horizontal shaft 36 has a guide roller 37 rotatably carried on an outer end remote from the swingable frame 30 to guide and position the pane 7. The horizontal shaft 36 has a pressing roller 38 rotatably carried on an end close to the rotational center to forcibly fit the shaped product 3 to the peripheral portion of the pane 7 while guiding the shaped product 3 having a certain cross-sectional shape. The guide roller 37 has an end close to the center of the swingable frame 30 located above a position midway between both ends of the floating roller 34 in its axial direction. The guide roller 37 has an end close to the X side projecting slightly outward in comparison with the X side end of the floating roller 34. The end of the guide roller 37 on the X side is formed with a roundly chamfered portion 37a, which has the diameter gradually decreased toward the outward direction of the swingable frame 30 to position and smoothly guide the supplied pane 7. The cylindrical portions of the floating roller 34 and the guide roller 37 have ends close to the X side substantially aligned on a line perpendicular to the drawing sheet.

The pressing roller 38 has an end close to the swing center O of the swingable frame 30 located slightly closer to the X side than the swing center O. The end of the pressing roller 38 close to the swing center O is provided with a flange 38a, which has the diameter gradually increased toward the swing center O. The periphery of the pressing roller 38 except for the flange 38a is parallel with the peripheries of the floating roller 34 and the guide roller 37 except for the chamfered portions 34a, 37a. In addition, the pressing roller 38 has a lower end of a round straight-sided cylindrical portion located at a slightly higher position than a lower end of the round straight-sided cylindrical portion of the guide roller 37.

The clearance between the guide roller 37 and the floating roller 34 is determined in consideration of the thickness of the pane 7. The clearance between the pressing roller 38 and the floating roller 34 is determined in consideration of the shape of the shaped product 3 and the thickness of the pane 7. The guide roller 37 has a lower end of the periphery located at the substantially same height as the swing center O of the swingable frame 30. If it is necessary to modify the clearance between the guide roller 37 and the floating roller 34 in order to fit the clearance to a changed thickness of the supplied pane 7, the guide roller 37 is replaced with one having a different diameter. Otherwise, the horizontal shaft 36 may be formed as an eccentric shaft, and the clearance between the guide roller 37 and the floating roller 34 may be controlled by adjusting the position of the eccentric shaft in the peripheral direction without replacement of the guide roller 37. In addition, the guide roller 37 may have a fluoro resin tape wrapped on the periphery thereof. It is preferable that the floating roller 34, the guide roller 37 and the pressing roller 38 have the peripheries made of a resinous material, such as fluoro resin, to prevent the pane 7 or the shaped product 3 from being damaged, though the peripheries may be made of a metallic material.

Above a position in the vicinity of the swing center O of the swingable frame 30, a vertical guide surface 30*b* is provided to guide a lip 3*b* of the shaped product 3 to be forcibly fitted to the pane 7 by the pressing roller 38. Above the guide surface 30*b*, a space 30*c* is provided to pass the lip 3*b* of the shaped product 3 therethrough. Between the guide roller 37 and the pressing roller 38 is interposed a component 30*d* of the swingable frame 30. The component 30*d* has a lower end located at a slightly higher position than the lower end of the periphery of the guide roller 37. Just under the swing center O of the swingable frame 30, a guide surface 30*e* is provided to guide the end surface of the pane 7. It is preferable that the guide surfaces 30*b*, 30*e* are made of a resinous material having a small friction resistance, such as fluoro resin, to prevent the lip 3*b* of the shaped product 3 or the end surface of the pane 7 from being damaged.

In FIG. 1, reference numeral 39 designates a helical tension spring, which is provided between the floating frame 23 and the swingable frame 30 to pull the swingable frame 30, positioning the swing center O or another element at ideal positions. Reference numeral 40 designates stoppers, which are fixed to the floating frame 23 to prevent the swingable frame 30 from falling out. In FIG. 2, reference numeral 41 designates a guide member, which is provided on the inlet side of the pressing member 40 to guide the edge surface of the pane 7 supplied between the guide roller 37 and the floating roller 34. The floating roller 34 is configured to be floating by a smaller force than the floating frame 23.

Figure 4:
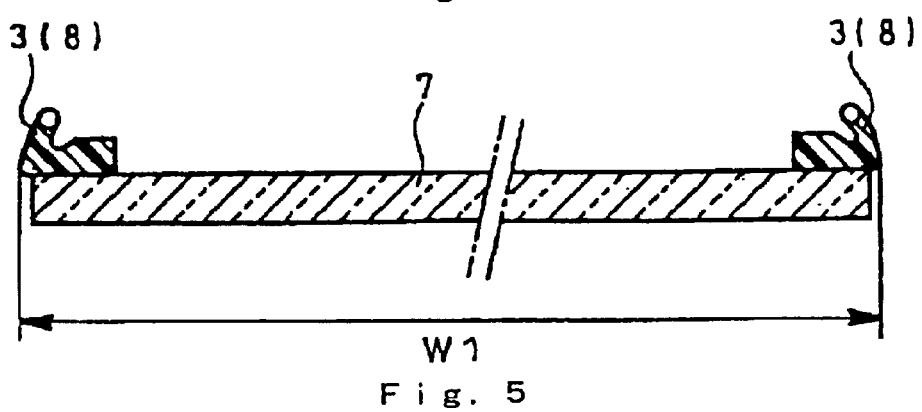
FIG. 4 is a cross-sectional view showing an example of the windowpane with a resinous frame, wherein a shaped product is forcibly fitted to a peripheral portion of the entire upper surface of the pane so as to be unified thereto as a frame.

Next, an example of the procedure wherein the shaped product is forcibly fitted to the pane by the apparatus shown in FIGS. 1, 2 and 3 will be explained, referring to FIG. 4 and FIG. 10 as well. FIG. 4 is a cross-sectional view of the windowpane with a resinous frame, wherein the shaped product is forcibly fitted to a peripheral portion on an upper surface of the pane so as to be unified the peripheral portion as a frame. The windowpane with a resinous frame shown in FIG. 4 gives an example wherein a frame 8 that is formed by forcibly fitting and unifying the shaped product 3 to the peripheral portion of the pane 7 project outward from the edge surface of the pane 7 by a small length, and the distance W1 between the outer reference planes of the frame 7 is set at a certain size. When the shaped product 3 is forcibly fitted to the pane 7 to provide the distance W1 between the outer reference planes of the frame 8 with the certain size as shown in FIG. 4, the stopper 20, the spacer 21 and the base frame 16 are fastened by the bolt 22 to prevent the base frame 16 from sliding along the guide rail 14. In addition, the clearance between the guide roller 37 and the floating roller 34 is determined to be smaller than the smallest thickness of the pane 7 that is provided due to manufacturing tolerances.

Figure 10:
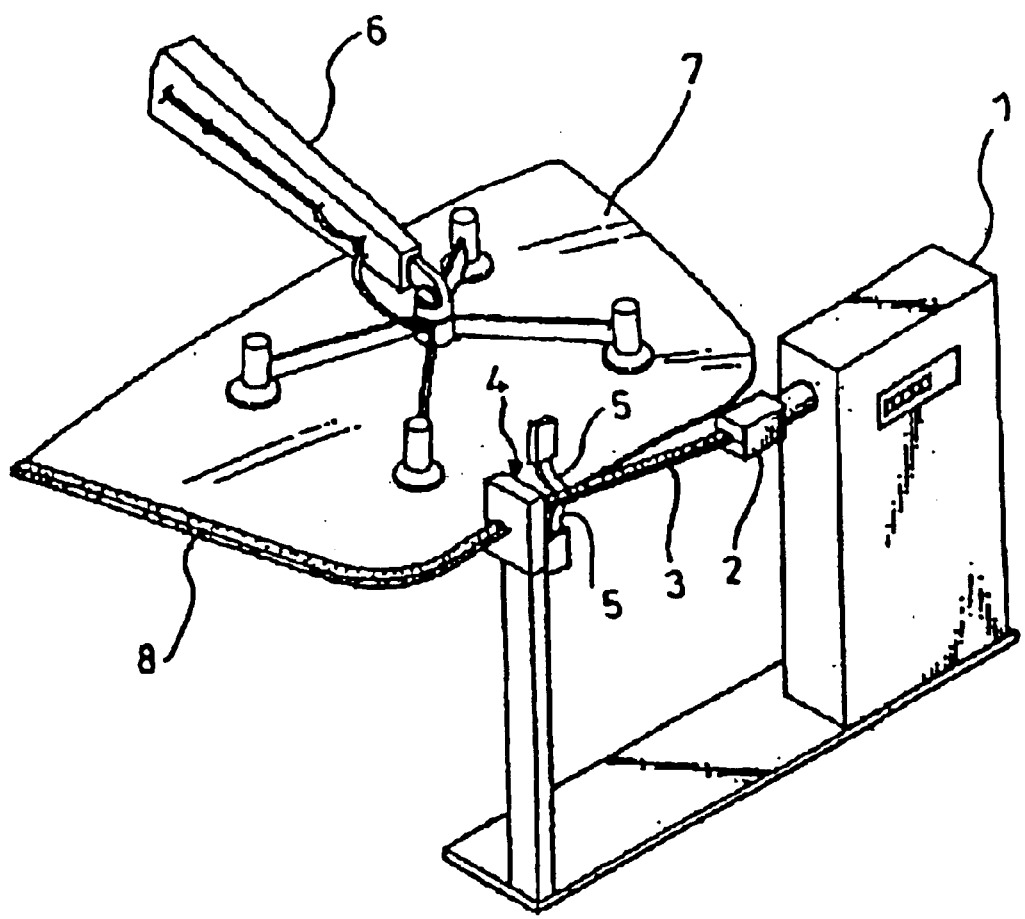
FIG. 10 is a perspective view showing a conventional preparation apparatus for a windowpane with a resinous frame.
Figure 11:
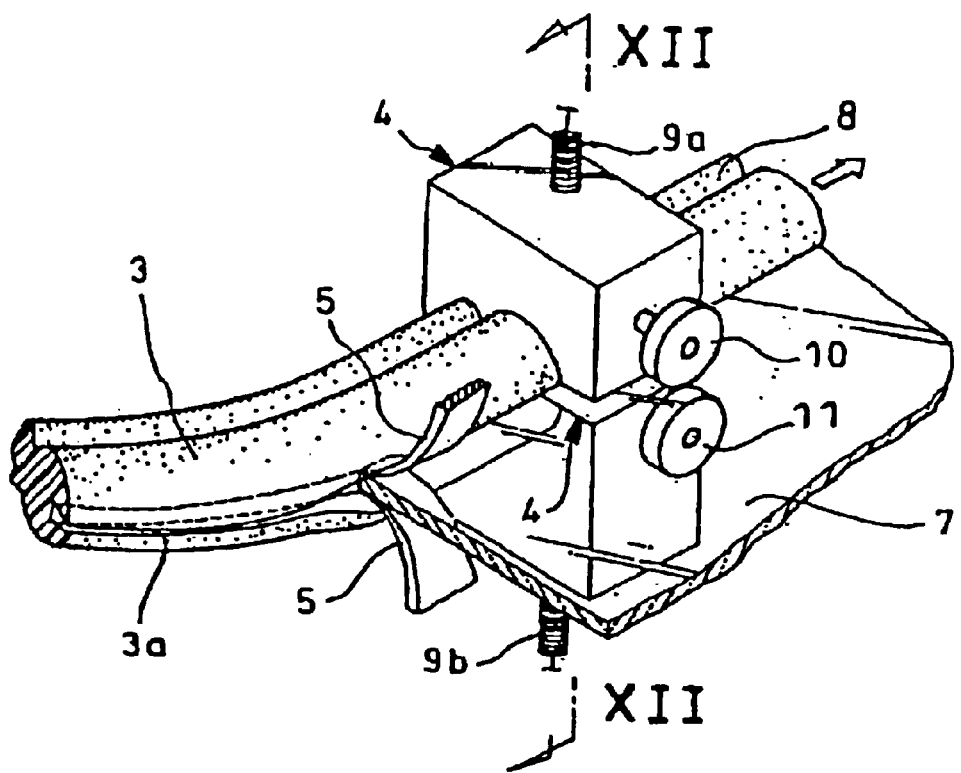
FIG. 11 is a perspective view showing how a shaped product is introduced into the pressing member shown in FIG. 10.
Figure 12:
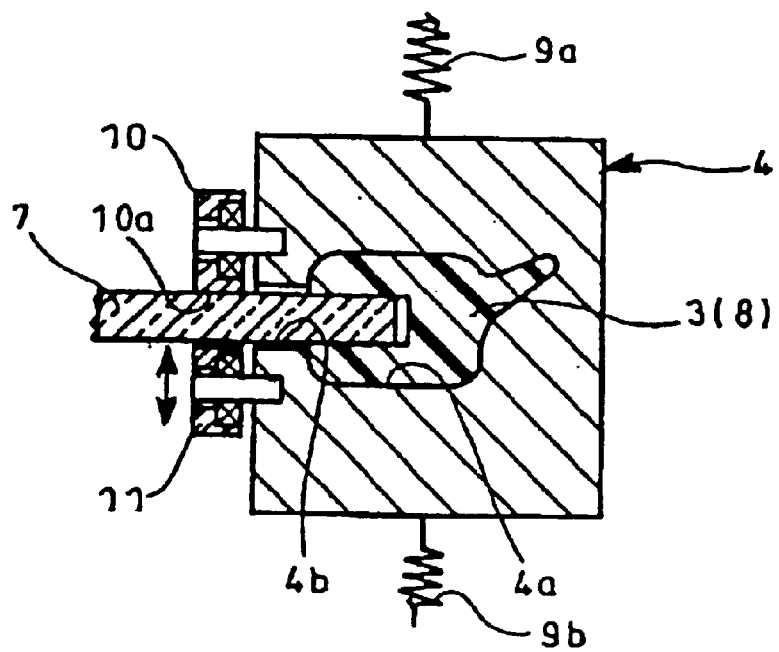
FIG. 12 is a cross-sectional view as seen from the direction indicated by arrows of XII—XII of FIG. 11.

The travel path for the pane 7 to follow is previously instructed on the operating robot 6 shown in FIG. 10. The travel path has been instructed on the operating robot 6 so that there is provided a clearance C1 between the edge surface 7*a* of the pane 7 indicated by an imaginary line (FIG. 3) and the guide surface 30*e* provided just under the swing center O of the swingable frame 30 whatever size the pane 7 has. The travel path is instructed on the operating robot 6 so that the upper surface of the pane 7 is ensured to be positioned by the lower edge of the periphery of the guide roller 37 above the floating roller 34, i.e., the edge surface 7*a* of the pane 7 is guided, abutting against the chamfered portion 37*a* of the guide roller 37. In this example, the slit plates 5 shown in FIG. 10 are unnecessary.

The resinous material for a frame, which is extruded in a certain cross-sectional shape from a shaping die 2 attached to the leading edge of the extruder 1, is pulled and forwarded to the pressing member 4 in the form of the shaped product 3 by a pulling device (not shown). At that time, the operating robot 6 is supporting the pane 7, being at rest. Thus, the pane 7 is waiting at a certain position. Then, the operating robot 6 operates to start the movement of the pane 7. The edge surface 7*a* of the pane 7 is guided by abutment with the guide member 41 and is guided and slightly lowered by abutment with the chamfered portion 37*a* of the guide roller 37, and the pane is introduced into the clearance between the guide roller 37 and the floating roller 34. Thus, the pane 7 has the location of the upper side positioned by the periphery of the lower end of the guide roller 37. At that time, the pane 7 abuts against an upper end of the periphery of the floating roller 34, pushing the floating roller 35 downward. The floating roller 34 lowers (floats) against the urging force of the helical compression spring 35, and the pane 7 is smoothly introduced into the clearance between the pressing roller 38 and the floating roller 34 in such a state that the pane is sandwiched and positioned between the guide roller 37 and the floating roller 34. The guide roller 37 and the floating roller 34 are rotated by the friction force with the pane 7.

Between the lower end of the periphery of the pressing roller 38 and the upper side of the pane 7 in the pressing member 4 is provided a delimiting space, which has substantially the same shape and the same size as the cross-sectional shape of the shaped product 3 except for the lip 3*b*. As a result, the shaped product 3 supplied to the pressing member 4 is introduced into the delimiting space defined by the lower end of the periphery of the pressing roller 38, the upper surface of the pane 7, the guide surface of the swingable frame 30 and a side surface of the component 30*d*, and the shaped product is forcibly fitted and unified to the upper side of the peripheral portion of the pane 7 in the form of the frame by the pressing roller 38. The lip 3*b* of the shaped product 3 can be protected from damage since the lip 3*b* is passing through the space 30*c*, being guided by the guide surface 30*b* of the swingable frame 30.

When forcibly fitting the shaped product to the pane, the feeding speed of the shaped product 3 and that of the pane 7 are synchronized. The shaped product 3 rotates the pressing roller 38 by the friction force and travels, abutting against the guide surface 30*b* of the swingable frame 30 and the abutting surface of the component 30*d*. Thus, the pulling resistance applied to the shaped product 3 is decreased in comparison with a case wherein the entire delimiting space serves as a guide surface. When the pane 7 that is introduced between the floating roller 34 and the guide roller 37 is curved, the swingable frame 30 swings about the swing center O as the basis in accordance with the curvature of the pane 7. Thus, the floating roller 34, the guide roller 37 and the pressing roller 38 also swing about the swing center O along with the swingable frame 30.

In a case wherein there is a size deviation in the pane 7 or a variation in the curved shape of the pane, the swingable frame 30 swings about the swing center O as the basis in a certain range in the circumferential direction in accordance with the size deviation in the pane 7 or the variation in the curved shape of the pane when the pane 7 has been positioned by being introduced between the guide roller 37 and the floating roller 34 to be sandwiched by both rollers 37, 42. Simultaneously, the floating frame 23 floats vertically integrally with the swingable frame 30 against the urging force of the helical compression springs 28, 29 in accordance with the size deviation of the pane 7 or the variation in the curved shape of the pane. Thus, the swingable frame 30 and the floating frame 23 rapidly absorb the size deviation of the pane 7 or the variation in the curved shape of the pane to maintain the relative positional relationship between the shaped product 3 and the pane 7 in a constant state. Accordingly, the shaped product 3 is pressed from a direction perpendicular to the surface of the pane 7, and the pane 7 is unified to the pane at an equal pressure.

As explained, even in a case wherein there is a size deviation in the pane 7 or a variation in the curved shape of the pane, the floating frame 23 and the swingable frame 30, and consequently the floating roller 34, the guide roller 37 and the pressing roller 38 can absorb the size deviation or the variation in the curved shape easily and rapidly since the floating frame 23 floats along with the swingable frame 30 without the pressing member 4 floating in its entirety. Thus, the shaped product 3 is unified to the pane 7 without causing a variation in the pressing force of the shaped product 3 against the pane 7. As a result, the adhesion force of the frame 8 against the pane 7 can be ensured. In addition, the frame 8, which is unified to the shaped product 3, has good appearance.

Figure 5:
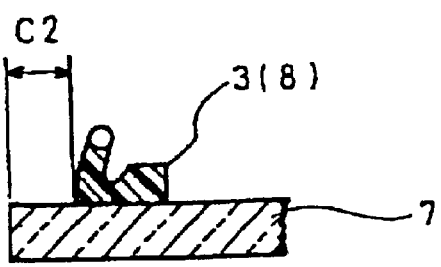
FIG. 5 is a cross-sectional view showing another example of the windowpane with a resinous frame, wherein a shaped product is forcibly fitted to a peripheral portion of the entire upper surface of the pane so as to be unified thereto as a frame.

Now, another example of the procedure wherein the pressing member according to the present invention shown in FIGS. 1, 2 and 3 is employed to forcibly press and unify the shaped product to the pane will be explained, referring to FIG. 5 and FIG. 10 as well. FIG. 5 is a cross-sectional view showing another example of the windowpane with a resinous frame, which has the shaped product forcibly fitted and unified to a peripheral portion of the upper surface thereof in the form of a frame. The windowpane with a resinous frame shown in FIG. 5 is one wherein the frame 8 is located on an inner side of the pane 7 by a distance C2 from the edge surface of the pane 7, and wherein the edge surface of the pane 7 serves as the reference for the fitting position.

When the shaped product 3 is forcibly fitted to the pane 7 so as to locate inwardly from the edge surface of the pane by the distance C2, the bolt 22 shown in FIG. 1 is unscrewed to remove the spacer 21 from between the stopper 20 and the base frame 16, allowing the base frame 16 to be slidable along the guide rail 14. The clearance between the guide roller 37 and the floating roller 34 is determined to be smaller than the smallest thickness of the pane 7 that is provided due to manufacturing tolerances. The travel path for the pane 7 to follow has been previously instructed on the operating robot 6 shown in FIG. 10. The travel path has been instructed on the operating robot 6 so that the edge surface of the pane is ensured to abut against the guide surface 30e provided just under the swing center O of the swingable frame 30 whatever size the pane 7 has. Thus, the floating frame 23 can slide along the guide rail 14 integrally with the swingable frame 30 with a to-and-fro motion.

In this case, when the operation robot 6 operates to introduce the pane 7 into between the guide roller 37 and the floating roller 34 in the pressing member 4, the edge surface of the pane 7 abuts against the guide surface 30e just under the swing center O of the swingable frame 30. As a result, the swingable frame 30 is pushed toward the direction opposite to the X side. Thus, the swingable frame 30 and the floating frame 23 slide along the guide rail 14 toward the direction opposite to the X side, and the floating roller 34, the guide roller 37 and the pressing roller 38 also move toward the opposite direction along with the swingable frame 30. The shaped product 3, which is introduced into the delimiting space defined by the lower end of the periphery of the pressing roller 38, the upper surface of the pane 7, and the guide surface 30b and the side surface of the component 30d of the swingable frame 30, has an end close to the swing center O of the swingable frame 30 guided by the guide surface 30b of the swingable frame 30. Accordingly, the distance from the edge surface of the pane 7 to an outer side surface of the shaped product 3 is ensured to be C2. Thus, the position where the frame 8 is unified is determined, the edge surface of the pane 7 serving as the reference.

Explanation of the behavior of the floating roller 34, the swingable frame 30 and the floating frame 23 in a case wherein there is a size deviation or a variation in the curved structure of the pane 7 will be omitted since the behavior is the same as in the case shown in FIG. 4 wherein the distance W1 between the opposite outer sides of the frame 8 is used as the reference. The pane 7 has an upper end of the edge surface close to the swing center O located at the swing center O of the swingable frame 30. In this case as well, the floating frame 23 and the swingable frame 30, and consequently the floating roller 34, the guide roller 37 and the pressing roller 38 can absorb the size deviation or the variation in the curved shape easily and rapidly since the floating frame 23 floats along with the swingable frame 30 without the pressing member 4 floating in its entirety. Without causing a variation in the pressing force of the shaped product 3 against the pane 7, the shaped product 3 is unified to the pane 7, and the adhesion force of the frame 8 against the pane 7 can be ensured. In addition, the frame 8, which is unified to the pane 7, has good appearance.

Figure 6:
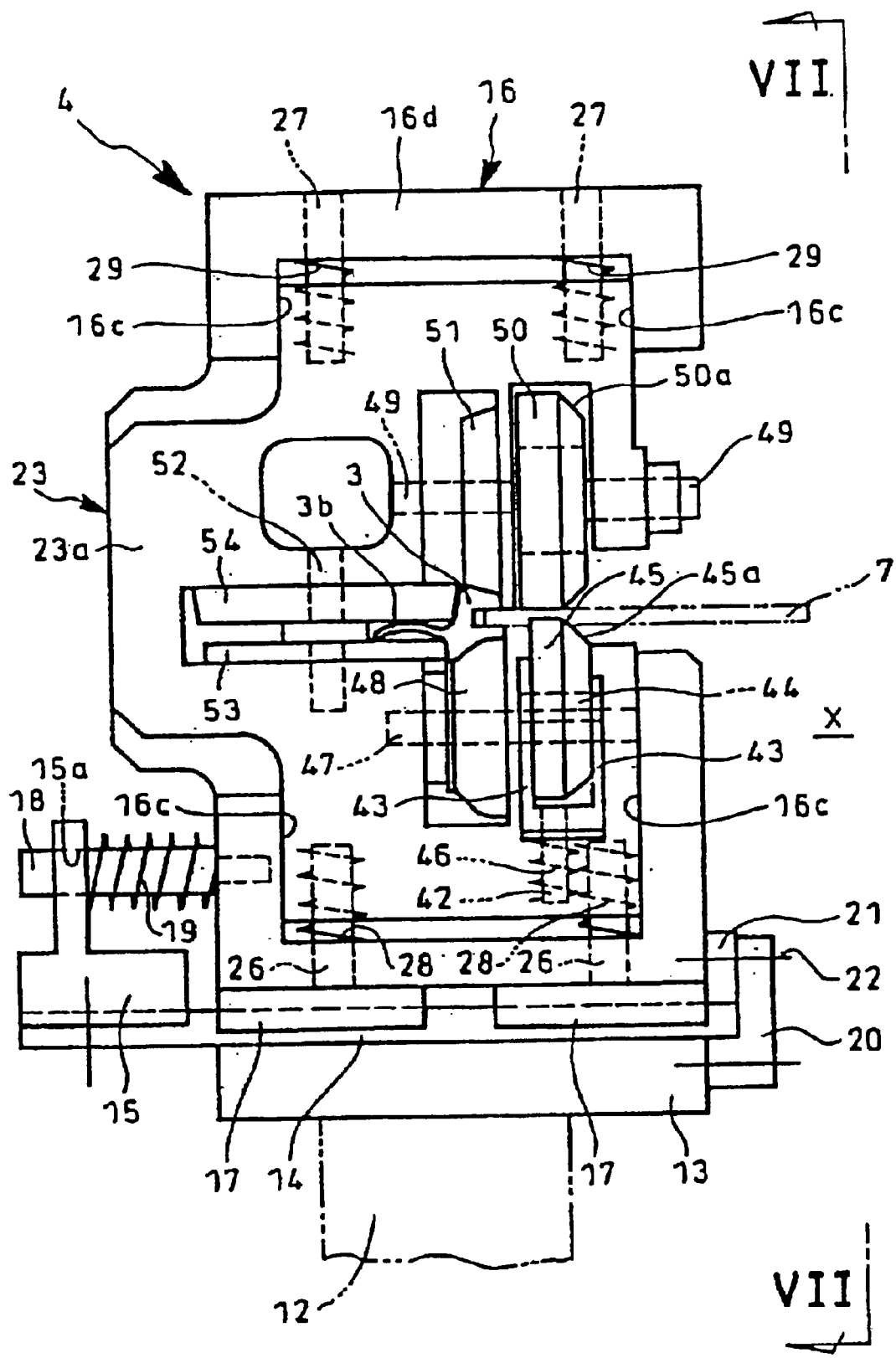
FIG. 6 is a front view showing another example of the embodiment of the pressing member, which is employed in the preparation method and apparatus for a windowpane with a resinous frame according to the present invention.
Figure 7:
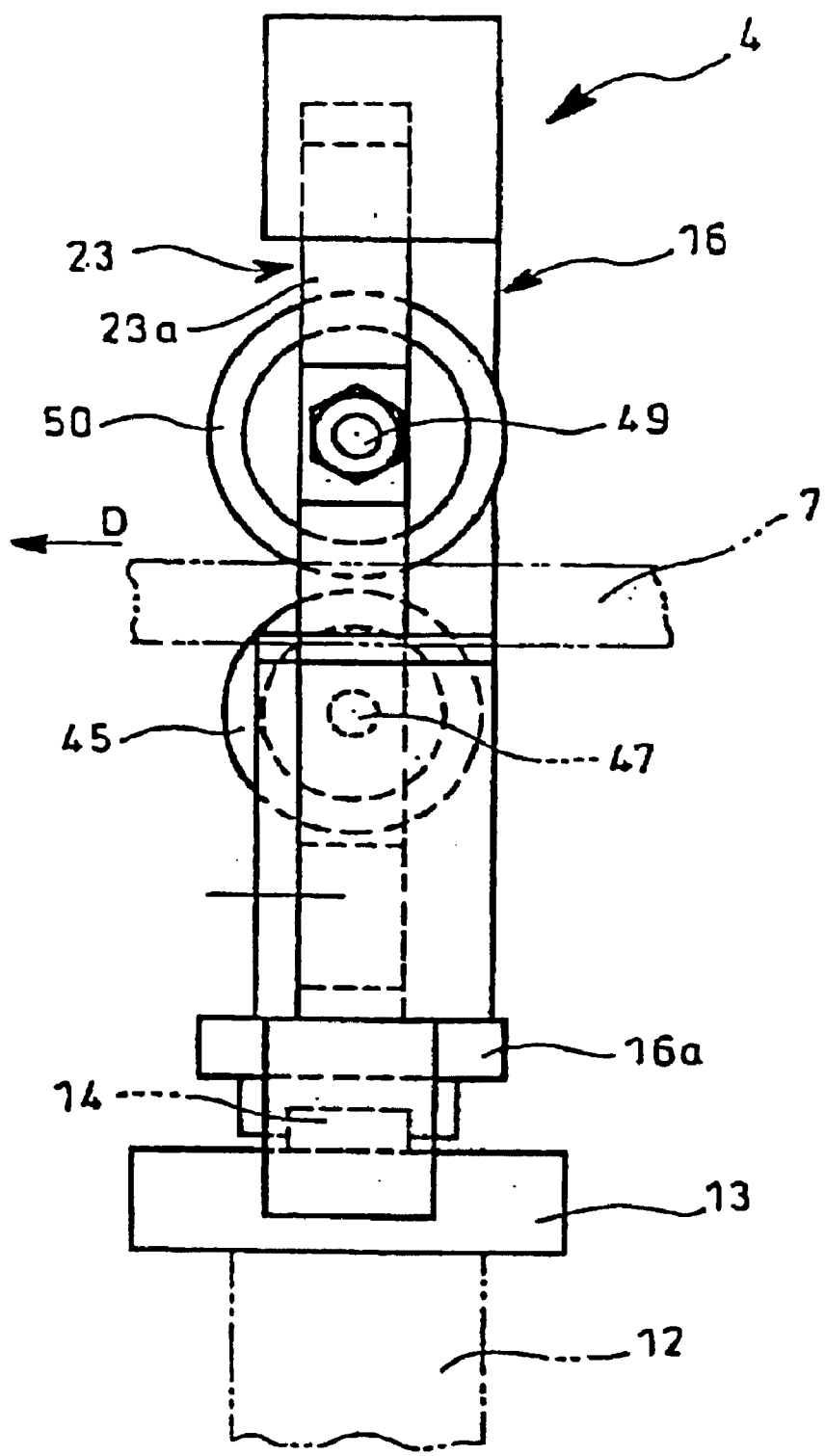
FIG. 7 is a cross-sectional view as seen from the direction indicated by arrows of VII—VII of FIG. 6.
Figure 8:
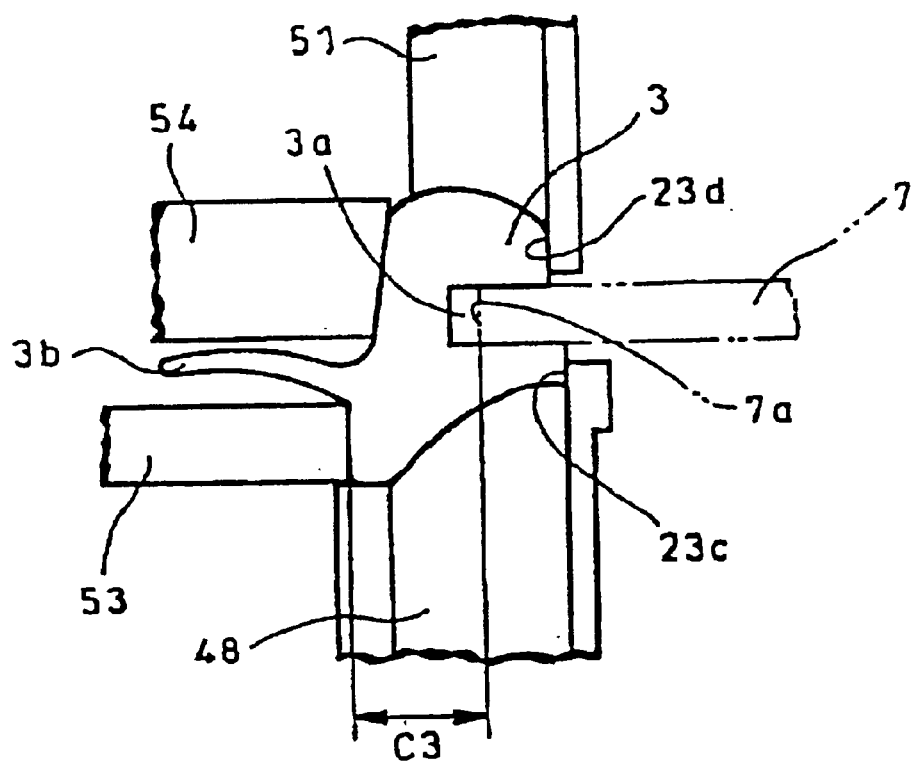
FIG. 8 is an enlarged view of the space defined by an upper pressing roller/a lower pressing roller, and an upper vertical wall roller/a lower vertical wall roller in the floating frame shown in FIG. 6.

FIG. 6 is a front view showing another example of the pressing member employed in the preparation method and apparatus for a windowpane with a resinous frame according to the present invention, FIG. 7 is a view as seen from the direction indicated by arrows of VII—VII of FIG. 6, and FIG. 8 is an enlarged view of a delimiting space defined by an upper pressing roller/a lower pressing roller, and an upper vertical wall roller/a lower vertical wall roller in the floating frame shown in FIG. 6. The pressing roller 4 according to this mode serves to forcibly fit and unify a shaped product 3 to upper and lower sides of the periphery of the pane 7 and the edge surface of the pane 7. This mode has features in the structure and arrangement of the floating frame 23 and the respective rollers mounted to the floating frame 23. In FIGS. 6 and 7, the same elements as those shown in FIGS. 1 and 2 are indicated by the same reference numerals.

The floating frame 23 is configured to be guided by guideways 16c of a base frame 16 and be urged by helical compression springs 28, 29 in floating fashion in the vertical direction. The floating frame 23 has a vertical portion 23a formed with a cutout opening to open toward the X side for mounting various kinds of rollers stated below. The floating frame 23 has a portion in the vicinity of a lower edge on the X side formed with a vertical guide hole, in which a guide rod 42 is engaged with play. The guide rod 42 has an upper end projecting into the cutout opening of the vertical portion 23a of the floating frame 23. On the upper end of the guide rod 42 is fixed a bracket 43, which is formed in a substantially U character shape as seen in the front view. A floating roller 45 for guiding the pane 7 is rotatably mounted to the bracket 43 through a horizontal shaft 44, which has the shaft center in parallel with a guide rod 18. The floating roller 45 has an end close to the X side provided with a chamfered portion 45a, which has the diameter gradually decreased toward the outward direction of the floating frame 23 to smoothly guide the introduced pane 7. The guide rod 42 has a helical compression spring 46 disposed on the periphery of a lower portion below the bracket 43 to urge upward and float the floating roller 45 through the bracket 43.

In the vertical portion 23a of the floating frame 23, a horizontal shaft 47 is provided at a location slightly lower than the horizontal shaft 44 of the floating roller 45 so to be in parallel with the horizontal shaft 44. The horizontal shaft 47 has the lower pressing roller 48 rotatably fitted thereon. The lower pressing roller 48 is close to the floating roller 45 and is located at a position farther from the X side than the floating roller 45. The lower pressing roller 48 has the periphery formed in a shape swelled toward outward as a cup facing laterally, and the periphery has the diameter gradually decreased in the direction remote from the floating roller 45. The floating roller 45 has an upper end of a round straight-sided cylindrical portion located at a slightly higher position than an upper end of the maximum diameter portion of the periphery of the lower pressing roller 48.

In an upper portion of the vertical portion 23a of the floating frame 23, a horizontal shaft 49 is mounted in parallel with the horizontal shafts 44, 47. The horizontal shaft 49 has a guide roller 50 and the upper pressing roller 51 rotatably fitted thereon side by side. The guide roller 50 is located substantially just above the floating roller 45, and the upper pressing roller 51 is located substantially just under the lower pressing roller 48. The guide roller 50 has an end close to the X side formed with a chamfered portion 50a, which has the diameter gradually decreased toward the outward direction of the floating frame 23. The floating roller 45 and the guide roller 50 have ends of the round straight-sided clyndrical portion close to the chamfered portions 45a, 50a located in substantially the same vertical plane.

The upper pressing roller 51 has the periphery formed in a shape shrunken toward the horizontal shaft 49 and having the diameter gradually decreased in the direction remote from the guide roller 50. In the vertical portion 23a of the floating frame 23, a vertical shaft 52 is mounted at a location farther from the X side than the horizontal shafts 47, 49. The lower vertical wall roller 53 and the upper vertical wall roller 54 are rotatably fitted on the vertical shaft 52 with a certain vertical spacing. The lower vertical wall roller 53 is formed in a circular plate, having a substantially equal diameter at an upper end and a lower end thereof. The upper vertical wall roller 54 has the diameter slightly reduced from upward to downward. The lower vertical wall roller 53 has a lower edge of the periphery close to the lower pressing roller 48 located in the vicinity of an upper edge of the periphery of the lower pressing roller 48 remote from the X side. The upper vertical wall roller 54 has an upper edge of the periphery close to a lower edge of the periphery of the upper pressing roller 51 remote from the X side.

Into the clearance provided between a lower end of the periphery of the guide roller 50 and an upper end of the periphery of the floating roller 45 is introduced the pane 7, which is supported by the operating robot 6. An upper end of the periphery of the lower pressing roller 48, a lower end of the periphery of the upper pressing roller 51, a peripheral side of the lower vertical wall roller 53 close to the lower pressing roller 48, a peripheral side of the upper vertical wall roller 54 close to the upper pressing roller 51, a guide surface 23c of the floating frame 23 close to an upper side of the lower pressing roller 48, and a guide surface 23d of the floating frame 23 close to an upper side of the upper pressing roller 51 provide a delimiting space. The delimiting space is a space, through which the shaped producet 3 except for a lip 3b is passing, and which is formed in substantially the same shape as the cross-sectional shape of the shaped product 3. Between the lower vertical wall roller 53 and the upper vertical wall roller 54 is provided a space, through which the lip 3b of the shaped product 3 is passing. When the clearance between the guide roller 50 and the floating roller 45 is modified, the procedure is carried out as in the case wherein the clearance between the guide roller 37 and the floating roller 45 shown in FIG. 1 is modified.

Figure 9:
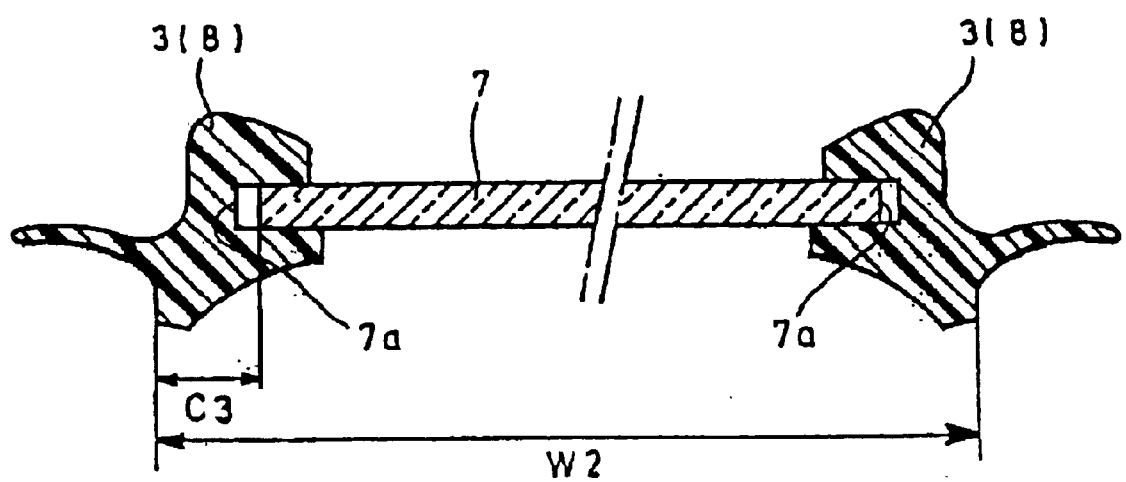
FIG. 9 is a cross-sectional view showing an example of the windowpane with a resinous frame, wherein a shaped product is forcibly fitted to the peripheral portion of the pane so as to cover an upper peripheral portion, a lower peripheral portion and an edge surface of the pane, being unified to the pane as a frame.

Now, the procedure wherein the shaped product is forcibly fitted and unified to the pane by the apparatus shown in FIGS. 6, 7 and 8 will be explained, referring to FIG. 9 as well. FIG. 9 is a cross-sectional view showing an example of the windowpane with a resinous frame wherein the shaped product is fitted to a peripheral portion of the pane and unified to the peripheral portion of the pane as a frame so as to cover an upper side of the peripheral portion, a lower side of the peripheral portion and the edge surface of the pane. The windowpane with a resinous frame shown in FIG. 9 is an example where the frame 8, which is provided by forcibly fitting and unifying the shaped product 3 to the peripheral portion of the pane 7, extends outward from the edge surface of the pane 7, and the distance W2 between the outer reference planes of the frame 8 is set at a certain size.

When the shaped product 3 is forcibly fitted to the pane 7 so as to provide the distance W2 between the outer reference planes of the frame 8 with a certain size as shown in FIG. 9, the stopper 20, the spacer 21 and the base frame 16 are fastened by the bolt 22 to prevent the base frame 16 from sliding along the guide rail 14. The clearance between the guide roller 50 and the floating roller 45 is determined to be smaller than the smallest thickness of the pane 7 that is provided due to manufacturing tolerances. The travel path for the pane 7 to follow has been previously instructed on the operating robot 6 shown in FIG. 10. The travel path has been instructed on the operating robot 6 so that there is provided a clearance C3 between the edge surface 7a of the pane 7 and the lower wall roller 53 as shown in FIGS. 8 and 9. The travel path has been instructed on the operating robot 6 so that the upper surface of the pane 7 is positioned by a lower edge of the periphery of the guide roller 50 above the floating roller 45, or the edge surface 7a of the pane 7 is guided by the chamfered portion 50a of the guide roller 50. In this example, it is preferable that the slit plates 5 shown in FIG. 10 are employed.

The resinous material for a frame, which is extruded in a certain cross-sectional shape from the leading edge of an extruder 1, is pulled and forwarded to the pressing member 4 in the form of the shaped product 3 by the pulling device (not shown). At that time, the operating robot 6 is supporting the pane 7, being at rest, with the pane 7 kept waiting at a certain position. Then, the operating robot 6 operates to start the movement of the pane 7. The edge surface 7a of the pane 7 is guided by abutment with the chamfered portion 50a of the guide roller 50 and is guided and slightly lowered by the chamfered portion 50a, and the pane is introduced into the clearance between the guide roller 50 and the floating roller 45 to be fitted into the biting portion 3a of the shaped product 3. Thus, the pane 7 has the location of the upper surface positioned by the periphery of the lower end of the guide roller 50. At that time, the pane 7 abuts against an upper end of the periphery of the floating roller 45, pushing the floating roller 45 downward. The floating roller 45 lowers (floats) against the urging force of the helical compression spring 46, and the pane 7 is smoothly introduced into the biting portion 3a of the shaped product in such a state that the pane is sandwiched and positioned between the guide roller 50 and the floating roller 45. The guide roller 50 and the floating roller 45 are rotated by the friction force with the pane 7.

The shaped product 3 supplied to the pressing member 4 is introduced into the space defined by the upper pressing roller 51/the lower pressing roller 48, the upper vertical wall roller 54/the lower vertical wall roller 53, and the guide surfaces 23c, 23d, and the shaped product except for the lip 3b is forcibly fitted and unified to the peripheral portion of the pane 7 in the form of the frame by the upper pressing roller 51/the lower pressing roller 48. The lip 3b of the shaped product 3 can be protected from damage since the lip 3b is passing through the space between the upper vertical roller 54 and the lower vertical roller 53. When forcibly fitting the shape product to the pane, the feeding speed of the shaped product 3 and that of the pane 7 are synchronized. The shaped product 3 rotates the upper pressing roller 51/the lower pressing roller 48, and the upper vertical wall roller 54/the lower vertical wall roller 53 by the friction force and travels, abutting against the guide surfaces 23c, 23d of the floating frame 23. Thus, the pulling resistance to the applied to the shaped product 3 is decreased in comparison with a case wherein the entire delimiting space serves as a guide surface.

In a case wherein there is a size deviation in the pane 7 or a variation in the curved shape of the pane, the floating frame 23 as a part of the pressing member 4 floats vertically against the urging forces of the helical compression springs 28, 29 when the pane 7 has been positioned by being introduced between the guide roller 50 and the floating roller 45 to be sandwiched by both rollers 45, 50. Thus, the floating frame 23, the guide roller 50, the floating roller 45, the upper pressing roller 51/the lower pressing roller 48, and the upper vertical wall roller 54/the lower vertical wall roller 53 rapidly absorb the size deviation of the pane 7 or the variation in the curved shape of the pane to maintain the relative positional relationship between the shaped product 3 and the pane 7 in a constant state. Accordingly, the shaped product 3 is forcibly fitted and unified to the pane 7 from directions perpendicular to the respective surfaces of the pane 7, specifically to the sides of the pane 7 by the upper pressing roller 51/the lower pressing roller 48 and to the edge surface of the pane 7 by the upper vertical wall roller 54/the lower vertical wall roller 53, ensuring the adhesion force of the frame 8 to the pane 7. And, the frame 8 unified to the pane 7 can have good appearance since the frame can be forcibly fitted at an equal pressure as a whole.

When the shaped product 3 is unified to the pane 7 with the edge surface of the pane 7 serving as the reference, the bolt 22 is unfastened to remove the spacer 21, and the operation is carried out in such a way that the floating frame 23 along with the base frame 16 can slide along the guide rail 14, as explained with respect to FIGS. 1 and 2. In that case, the travel path has been instructed on the operating robot 6 so that the pane 7 introduced into the biting portion 3a of the shaped product 3 can always abut against a deep wall portion of the biting portion 3a of the shaped product 3. In that case as well, the shaped product 3 can be forcibly fitted to the pane 7 at an equal pressure, the required adhesion force can be ensured, and the frame 8 can have good appearance.

In the above-mentioned example, the frame 8 has such a shape that the lip 3b projects from a substantially central portion of the edge surface of the periphery of the frame 8 (the edge surface locating on the opposite side of the opening direction of the pane biting portion 3a). In consideration of that, the upper vertical wall roller 54 and the lower vertical wall roller 53 form vertical wall rollers to avoid interference with the lip 3b. The frame 8 may be formed in various shapes, and the frame may have such a shape that the lip projects from a lower portion or an upper portion of the edge surface of the periphery of the frame, for instance. In this case, a single roller may serve as a vertical wall roller.

When the frame is not provided on the upper surface of the pane, in that case, the upper pressing roller 51 abuts against the upper surface of the pane 7.

With regard to the pane used in the present invention, ones used as a windowpane for a vehicle or building, such as a single glass sheet, laminated glass, laminated glass with a transparent synthetic resin film laminated on a glass sheet, and insulating glass, are selectively adopted according to applications or other factors. Those types of glass sheets may be subjected to bending process, tempering treatment, function coating treatment or the like. Beside those glass sheets, a transparent organic resinous sheet called organic glass, or a glass sheet with organic glass laminated thereon can be adopted.

Examples of the resinous material for the frame used in the present invention include materials usable in extrusion, such as a thermoplastic resin to be heated and melted for use, and a thermoset or moisture setting resin. Examples of the thermoplastic resin include a polyvinyl chloride, a copolymer of a vinyl chloride and an ethylene, a styrene resin and an olefin resin. Examples of the thermoset resin and the moisture setting resin include a urethane resin and a silicone resin. Besides, there can be used, e.g., a vinyl chloride in a sol state, which is extruded from the shaping die, is shaped and then is heated so as to be formed as a frame.

Among those materials, it is preferable to select the thermoplastic resin in order that the extruded shaped product has only the outermost portion solidified so as to possess excellent adhesion at the connection portion with the pane. Although also in the case of using the moisture setting resin or the thermosetting setting resin, moisture or heat can be given only to the surface of the extruded shaped product to solidify only the outermost portion of the shaped product, it is difficult to control the degree of solidification. On the other hand, the thermoplastic resin can be easily solidify only the surface of the shaped product to the extent that neither deformation nor irregularities on the surface occurs because the thermoplastic resin can be subjected to cooling or self-cooling to solidify only a portion having a lower temperature even if the resin is melted to form an extrusion grade. The shape of the frame is properly determined according to applications or other factors. The frame is unified to a single surface, a single surface and an edge surface, or an edge surface and both surfaces of the pane to cover the entire peripheral portion of the pane or a part of the entire peripheral portion, according to applications or other factors. Examples of a member for floating the floating frame include various elastic members, such as a hydropneumatic cylinder, besides a helical compression spring.

In the respective examples stated earlier, the pressing member is fixed, and the pane is moved by the operation of the operating robot to relatively move the pressing member with respect to the windowpane along the periphery of the windowpane. Conversely, the pressing member may be moved with the pane fixed, or the pressing member and the pane may be both moved to relatively move the pressing member with respect to the windowpane along the periphery of the windowpane.

INDUSTRIAL APPLICABILITY

In the preparation method of a windowpane with a resinous frame according to the present invention, what floats vertically is not the pressing member in its entirety but the floating frame, the pressing roller mounted thereto and other members. By this arrangement, even if there is a size deviation or a variation in the curved shape of the pane, the floating frame can rapidly float, allowing the respective pressing rollers to absorb the size deviation or the variation in the curved shape easily and rapidly. As a result, the shaped product can be unified to a peripheral portion of a plate-shaped member at a certain and equal pressure without creating any variation in the adhesion force. Thus, the adhesion force of the frame to the plate-shaped member can be ensured. In addition, the unified frame can have good appearance since the entire frame is forcibly fitted at such an equal pressure.

What is claimed is:

1. A method for preparing a windowpane with a frame, which comprises extruding a resinous material for a frame in a certain shape from a shaping die to form a shaped product for the frame, introducing a windowpane into a pressing member as well as forwarding the shaped product to the pressing member, the pressing member located at a position apart from the shaping die by a certain distance, and relatively moving the pressing member with respect to the windowpane along a peripheral portion of the windowpane so as to forcibly fit the shaped product to at least one surface of the peripheral portion of the windowpane, the method further comprising providing a pressing roller in a floating frame located so as to be vertically movable with respect to the pressing member, providing a delimiting space, at least a portion of which is defined by the pressing roller, and unifying the frame to the peripheral portion of the windowpane by forcibly fitting the shaped product to the peripheral portion of the windowpane by means of the pressing roller while passing the shaped product and the windowpane through the delimiting space.

2. The method for preparing a windowpane with a frame according to claim 1, wherein the vertical movement of said floating frame includes a floating movement.

3. The method for preparing a windowpane with a frame according to claim 1, wherein the pressing member includes a base frame, and the floating frame is provided inside the base frame through an elastic member so as to be vertically movable with respect to the base frame; and the pressing roller is provided inside the floating frame, the method further comprising utilizing the pressing member to unify the frame to the peripheral portion of the windowpane.

4. The method of preparing a windowpane with a frame according to claim 3, wherein the vertical movement of said floating frame includes a floating movement.

5. A method for preparing a windowpane with a frame, which comprises extruding a resinous material for a frame in a certain shape from a shaping die to form a shaped product for the frame, introducing a windowpane into a pressing member as well as forwarding the shaped product to the pressing member, the pressing member located at a position apart from the shaping die by a certain distance, and relatively moving the pressing member with respect to the windowpane along a peripheral portion of the windowpane so as to forcibly fit the shaped product to one surface of the peripheral portion of the windowpane, the method further comprising providing a floating frame so as to be vertically movable with respect to the pressing member, providing a swingable frame in the floating frame so as to be swingable, providing a pressing roller in the swingable frame to provide a delimiting space, at least a portion of which is defined by the pressing roller, and unifying the frame to the peripheral portion of the windowpane by forcibly fitting the shaped product to the peripheral portion of the windowpane by the pressing roller while passing the shaped product and the windowpane through the delimiting space.

6. The method for preparing a windowpane with a frame according to claim 5, which comprises fitting and unifying the shaped product to the peripheral portion of the windowpane while providing the floating frame with a to-and-fro motion in a direction perpendicular to a travel direction of the shaped product as seen in a plan view by pressing the floating frame directly or through the shaped product by means of an edge surface of the windowpane.

7. The method for preparing a windowpane with a frame according to claim 5, wherein the pressing member includes a base frame, and the floating frame is provided inside the base frame through an elastic member so as to be vertically movable with respect to the base frame, and the swingable frame is provided inside the floating frame so as to be movable; and the pressing roller is provided inside the swingable frame, the method further comprising utilizing the pressing member to unify the frame to the peripheral portion of the windowpane.

8. The method for preparing a windowpane with a frame according to claim 7, which comprises fitting and unifying the shaped product to the peripheral portion of the windowpane while providing the floating frame with a to-and-fro motion in a direction perpendicular to a travel direction of the shaped product as seen in a plan view by pressing the floating frame directly or through the shaped product by means of an edge surface of the windowpane.

9. A method for preparing a windowpane with a frame, which comprises extruding a resinous material for a frame in a certain shape from a shaping die to form a shaped product for the frame, introducing a windowpane into a pressing member as well as forwarding the shaped product to the pressing member, the pressing member located at a position apart from the shaping die by a certain distance, and relatively moving the pressing member with respect to the windowpane along a peripheral portion of the windowpane so as to forcibly fit the shaped product to both surfaces of the peripheral portion of the windowpane, the method further comprising providing a floating frame with a lower pressing roller for pressing a lower side of the shaped product and a vertical wall roller for pressing an edge surface of the shaped product remote from an opening direction of a windowpane biting portion of the shaped product toward an inner portion of the windowpane, the floating frame provided so as to be vertically movable with respect to the pressing member, and unifying the frame to the peripheral portion of the windowpane by forcibly fitting the shaped product to the peripheral portion of the windowpane by means of the lower pressing roller while passing the shaped product and the windowpane through a delimiting space, at least a portion of which is defined by the lower pressing roller and the vertical wall roller.

10. The method for preparing a windowpane with a frame according to claim 9, which comprises fitting and unifying the shaped product to the peripheral portion of the windowpane while providing the floating frame with a to-and-fro motion in a direction perpendicular to a travel direction of the shaped product as seen in a plan view by pressing the floating frame directly or through the shaped product by means of an edge surface of the windowpane.

11. The method for preparing a windowpane with a frame according to claim 9, wherein the vertical movement of said floating frame includes a floating movement.

12. The method for preparing a windowpane with a frame according to claim 9, wherein the pressing member includes a base frame, and the floating frame is provided inside the base frame through an elastic member so as to be vertically movable with respect to the base frame; and the lower pressing roller and the vertical roller are provided inside the floating frame, the method further comprising utilizing the pressing member to unify the frame to the peripheral portion of the windowpane.

13. The method for preparing a windowpane with a frame according to claim 12, which comprises fitting and unifying the shaped product to the peripheral portion of the windowpane while providing the floating frame with a to-and-fro motion in a direction perpendicular to a travel direction of the shaped product as seen in a plan view by pressing the floating frame directly or through the shaped product by means of an edge surface of the windowpane.

14. The method for preparing a windowpane with a frame according to claim 12, wherein the vertical movement of said floating frame includes a floating movement.

15. An apparatus for preparing a windowpane with a frame, which comprises a shaping die for extruding a resinous material for a frame in a certain shape to form a shaped product for the frame, a pressing member provided at a position apart from the shaping die by a certain distance and receiving the shaped product and a windowpane therein, and a driving device for relatively moving the pressing member with respect to the windowpane along a peripheral portion of the windowpane, and which forcibly fits the shaped product to at least one surface of the peripheral portion of the windowpane, wherein the pressing member includes a base frame, a floating frame provided inside the base frame through an elastic member so as to be vertically movable with respect to the base frame, and a pressing roller provided inside the floating frame, the pressing roller defining at least a portion of a delimiting space, through which the shaped product and the windowpane are passing, wherein the shaped product is forcibly fitted to the peripheral portion of the windowpane by the pressing roller to be unified to the peripheral portion of the windowpane.

16. The apparatus for preparing a windowpane with a frame according to claim 15, wherein said floating frame is supported so that the vertical movement of said floating frame includes a floating movement.

17. An apparatus for preparing a windowpane with a frame, which comprises a shaping die for extruding a resinous material for a frame in a certain shape to form a shaped product for the frame, a pressing member provided at a position apart from the shaping die by a certain distance and receiving the shaped product and a windowpane therein, and a driving device for relatively moving the pressing member with respect to the windowpane along a peripheral portion of the windowpane, and which forcibly fits the shaped product to at least one surface of the peripheral portion of the windowpane, wherein the pressing member includes a base frame, a floating frame provided inside the base frame through an elastic member so as to be vertically movable with respect to the base frame, a swingable frame swingably provided inside the floating frame, and a pressing roller provided inside the swingable frame, the pressing roller defining at least a portion of a delimiting space, through which the shaped product and the windowpane are passing, wherein the shaped product is forcibly fitted to the peripheral portion of the windowpane by the pressing roller to be unified to the peripheral portion of the windowpane.

18. An apparatus for preparing a windowpane with a frame, which comprises a shaping die for extruding a resinous material for a frame in a certain shape to form a shaped product for the frame, a pressing member provided at a position apart from the shaping die by a certain distance and receiving the shaped product and a windowpane therein, and a driving device for relatively moving the pressing member with respect to the windowpane along a peripheral portion of the windowpane, and which forcibly fits the shaped product to at least one surface of the peripheral portion of the windowpane, wherein the pressing member includes a base frame, a floating frame provided inside the base frame through an elastic member so as to be vertically movable with respect to the base frame, and a lower pressing roller for pressing a lower side of the shaped product and a vertical wall roller for pressing an edge surface of the shaped product remote from an opening direction of a windowpane biting portion of the shaped product toward an inner portion of the windowpane, both rollers provided inside the floating frame and defining at least a portion of a delimiting space, through which the shaped product and the windowpane are passing, wherein the shaped product is forcibly fitted to the peripheral portion of the windowpane by the lower pressing roller and the vertical wall roller to be unified to the peripheral portion of the windowpane.

19. The apparatus for preparing a windowpane with a frame according to claim 18, wherein said floating frame is supported so that the vertical movement of said floating frame includes a floating movement.

* * * * *